United States Patent
Peng et al.

(10) Patent No.: US 11,665,018 B2
(45) Date of Patent: May 30, 2023

(54) OBD INTERFACE BUS TYPE DETECTION METHOD AND APPARATUS

(71) Applicant: AUTEL INTELLIGENT TECHNOLOGY CORP., LTD., Guangdong (CN)

(72) Inventors: Zhibin Peng, Guangdong (CN); Songsong Qu, Guangdong (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 218 days.

(21) Appl. No.: 16/913,843

(22) Filed: Jun. 26, 2020

(65) Prior Publication Data
US 2020/0328910 A1  Oct. 15, 2020

Related U.S. Application Data

(63) Continuation of application No. PCT/CN2018/123134, filed on Dec. 24, 2018.

(30) Foreign Application Priority Data

Dec. 27, 2017 (CN) .......................... 201711448348.7

(51) Int. Cl.
*H04L 12/40* (2006.01)
*G07C 5/08* (2006.01)
(Continued)

(52) U.S. Cl.
CPC ...... *H04L 12/40169* (2013.01); *G07C 5/0808* (2013.01); *H04L 12/40045* (2013.01);
(Continued)

(58) Field of Classification Search
None
See application file for complete search history.

(56) References Cited

U.S. PATENT DOCUMENTS 9,286,266 B1 * 3/2016 Fleck .................. G07C 5/0825
11,508,191 B1 * 11/2022 Herron ................. G06F 1/1613
(Continued)

FOREIGN PATENT DOCUMENTS

| CN | 104090565 A | 10/2014 |
| CN | 104731082 A | 6/2015 |

OTHER PUBLICATIONS

The International Search Report dated Apr. 1, 2019; PCT/CN2018/123134.
(Continued)

*Primary Examiner* — Henry Tsai
*Assistant Examiner* — Christopher A Bartels
(74) *Attorney, Agent, or Firm* — Andrew C. Cheng

(57) ABSTRACT

The present invention provides an OBD interface bus type detection method and apparatus. The method includes: determining a first bus feature of a connection cable associated with a selected pin in an on-board diagnostics OBD interface; matching the first bus feature with an OBD interface bus library and determining a bus type of the connection cable associated with the selected pin; determining, according to the bus type of the connection cable associated with the selected pin, a second bus feature of the connection cable associated with the selected pin; and sending the second bus feature to a vehicle diagnostic instrument, to enable the vehicle diagnostic instrument to perform communications protocol scanning on the selected pin in the OBD interface according to the second bus feature. According to the present invention, a communications protocol meeting the second bus feature may be directly used by the vehicle diagnostic instrument to perform diagnostic scanning on the selected pin, thereby reducing scanning interference for different bus types.

8 Claims, 5 Drawing Sheets

Collect a waveform data signal of a selected pin in an OBD interface — S1011

Convert the waveform data signal into a corresponding digital signal — S1012

Obtain, after analyzing the digital signal, a first bus feature of a connection cable associated with the selected pin — S1013

(51) Int. Cl.
*H04L 43/08* (2022.01)
*H04L 43/50* (2022.01)
(52) U.S. Cl.
CPC .............. *H04L 43/08* (2013.01); *H04L 43/50* (2013.01); *H04L 2012/40215* (2013.01); *H04L 2012/40273* (2013.01)

(56) References Cited

U.S. PATENT DOCUMENTS

| | | | |
|---|---|---|---|
| 2005/0137757 A1* | 6/2005 | Phelan ..................... | G07C 5/02 701/1 |
| 2013/0073112 A1* | 3/2013 | Phelan ..................... | G07C 5/02 701/1 |
| 2017/0085319 A1* | 3/2017 | Latham ................... | H04L 12/40 |
| 2017/0134215 A1* | 5/2017 | Chini ................... | H04L 41/0631 |
| 2019/0081805 A1* | 3/2019 | Frezza ................... | H04L 67/12 |
| 2019/0385057 A1* | 12/2019 | Litichever ............... | H04L 63/14 |
| 2020/0334924 A1* | 10/2020 | Wells ..................... | H04L 67/04 |
| 2022/0234602 A1* | 7/2022 | Chen ..................... | G01R 13/00 |
| 2022/0245972 A1* | 8/2022 | Chen ..................... | H04L 12/40 |

OTHER PUBLICATIONS

The First Chinese Office Action dated Mar. 20, 2019; Appln. No. 201711448348.7.

* cited by examiner

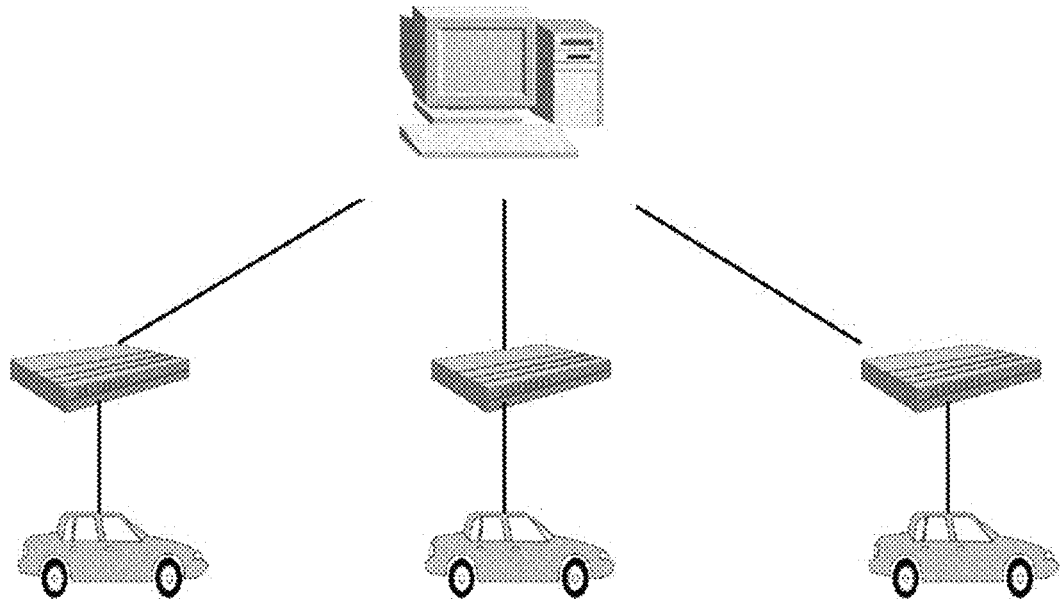

FIG. 1

Determine a first bus feature of a connection cable associated with a selected pin in an on-board diagnostics OBD interface ⸺ S101

Match the first bus feature with an OBD interface bus feature library, and determine a bus type of the connection cable associated with the selected pin ⸺ S102

Determine, according to the bus type of the connection cable associated with the selected pin, a second bus feature of the connection cable associated with the selected pin ⸺ S103

Send the second bus feature to a vehicle diagnostic instrument, to enable the vehicle diagnostic instrument to perform communications protocol scanning on the selected pin in the OBD interface according to the second bus feature ⸺ S104

FIG. 2

Single bus CAN:
Level of a dominant bit CANH is 4 V
Low-speed error tolerant CAN:
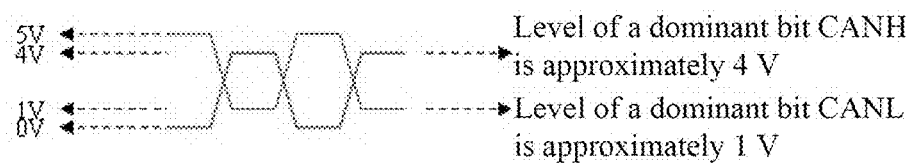
Level of a dominant bit CANH is approximately 4 V
Level of a dominant bit CANL is approximately 1 V
High-speed CAN:
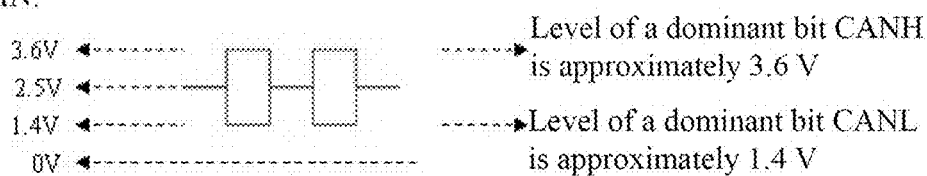
Level of a dominant bit CANH is approximately 3.6 V
Level of a dominant bit CANL is approximately 1.4 V
FIG. 9

OBD INTERFACE BUS TYPE DETECTION METHOD AND APPARATUS

This application is a continuation application of International Application No. PCT/CN2018/123134, filed on Dec. 24, 2018, which claims priority of Chinese Patent Application No. 201711448348.7, filed on Dec. 27, 2017, which is incorporated herein by reference in its entirety.

TECHNICAL FIELD

The present application relates to the technical field of vehicle fault diagnosis, and in particular, to an OBD interface bus type detection method and apparatus.

RELATED ART

Currently, most vehicles are equipped with an on-board diagnostics (OBD), mainly configured to monitor, according to a running status of an engine and a working status of a tail gas after-treatment system, at any time whether vehicle exhaust emissions exceed the standards. Once the vehicle exhaust emissions exceed the standards, the OBD immediately issues a warning. In addition, an external interface (OBD I or OBD II) of the on-board diagnostics OBD is configured to connect an external diagnostic device and the on-board diagnostics, to implement diagnosis of a vehicle.

When the OBD is started, and the vehicle is diagnosed by using the external diagnostic device, a protocol type of a specific electronic control unit (ECU) usually needs to be determined in a manner of scanning on-vehicle communications protocols in sequence. However, different on-vehicle communications protocols are based on different physical layer protocols, and therefore, have greatly different levels and potentials output on a bus. For example, in a K-line ISO 9141 protocol, a high level is 12 V, a low level being 0 V. In a CAN-bus ISO 15765 protocol, a recessive voltage is 2.5 V, a dominant voltage being 3.5/1.5 V. When the K-line protocol is used to scan the CAN bus, a situation that a voltage of the CAN bus is pulled up to 12 V may occur. Consequently, the electronic control unit corresponding to the CAN bus is affected, communication of the CAN bus being seriously interfered with.

Types of buses connected to different pins in an OBD interface are determined in a manner of scanning various on-vehicle communications protocols in sequence, to implement communication with ECUs connected to the pins. Communication data of some buses may be seriously interfered with. Consequently, diagnosis of the vehicle is affected. Even stability of the OBD is affected.

SUMMARY

The present invention provides an OBD interface bus type detection method and apparatus, to predetermine a second bus feature of a connection cable associated with a selected pin in an OBD interface, so that a vehicle diagnostic instrument can directly adopt a communications protocol meeting the second bus feature, to perform diagnostic scanning on the selected pin, thereby reducing scanning interference for different bus types.

According to a first aspect, an embodiment of the present invention provides an OBD interface bus type detection method, including:

determining a first bus feature of a connection cable associated with a selected pin in an on-board diagnostics OBD interface;

matching the first bus feature with an OBD interface bus feature library and determining a bus type of the connection cable associated with the selected pin;

determining, according to the bus type of the connection cable associated with the selected pin, a second bus feature of the connection cable associated with the selected pin; and sending the second bus feature to a vehicle diagnostic instrument, to enable the vehicle diagnostic instrument to perform communications protocol scanning on the selected pin in the OBD interface according to the second bus feature.

Optionally, the determining a first bus feature of a connection cable associated with a selected pin in an OBD interface includes:

collecting a waveform data signal of the selected pin in the OBD interface;

converting the waveform data signal into a corresponding digital signal; and obtaining, after analyzing the digital signal, the first bus feature of the connection cable associated with the selected pin.

Optionally, the converting the waveform data signal into a corresponding digital signal includes:

sampling the waveform data signal to obtain a sampled signal, where the sampled signal is used to represent a plurality of voltage values; and converting the sampled signal into the corresponding digital signal, where the voltage values in the sampled signal correspond to a preset quantity of bits.

Optionally, the first bus feature includes any one or more of the following features:

a high level voltage value, a low level voltage value and a baud rate.

Optionally, the OBD interface bus feature library includes a physical layer feature of each bus and a bus type corresponding to the physical layer feature, including a high level voltage value, a low level voltage value and a baud rate.

According to a second aspect, an embodiment of the present invention provides an OBD interface bus type detection method, including:

receiving a second bus feature of a connection cable associated with a selected pin in an on-board diagnostics OBD interface, where the second bus feature is obtained according to a bus type of the connection cable associated with the selected pin, the bus type being determined according to a first bus feature of the connection cable associated with the selected pin and an OBD interface bus feature library; and judging whether a bus feature that is set in a current on-vehicle communications protocol adopted for diagnostic scanning matches the second bus feature of the connection cable associated with the selected pin and resetting an on-vehicle communications protocol if the bus feature that is set in the current on-vehicle communications protocol adopted for diagnostic scanning does not match the second bus feature of the connection cable associated with the selected pin.

Optionally, after the receiving a second bus feature of a connection cable associated with a selected pin in an on-board diagnostics OBD interface, the method further includes:

performing communication with the selected pin in the OBD by adopting the current on-vehicle communications protocol if the bus feature that is set in the current on-vehicle communications protocol adopted for diagnostic scanning matches the second bus feature.

Optionally, the judging whether a bus feature that is set in a current on-vehicle communications protocol adopted for diagnostic scanning matches the second bus feature of the connection cable associated with the selected pin includes:

comparing the bus feature that is set in the on-vehicle communications protocol adopted for diagnostic scanning with the second bus feature, to obtain M differences, where M is a quantity of features for comparison, M being a positive integer;

judging whether a difference greater than a preset limit value corresponding to the difference exists in the M differences; and determining that the bus feature that is set in the current on-vehicle communications protocol does not match the second bus feature if the difference greater than the preset limit value corresponding to the difference exists in the M differences.

According to a third aspect, an embodiment of the present invention provides an OBD interface bus type detection apparatus, including:

a determining module, configured to determine a first bus feature of a connection cable associated with a selected pin in an on-board diagnostics OBD interface;

a matching module, configured to match the first bus feature with an OBD interface bus feature library and determine a bus type of the connection cable associated with the selected pin;

a processing module, configured to determine, according to the bus type of the connection cable associated with the selected pin, a second bus feature of the connection cable associated with the selected pin; and a sending module, configured to send the second bus feature to a vehicle diagnostic instrument, to enable the vehicle diagnostic instrument to perform communications protocol scanning on the selected pin in the OBD interface according to the second bus feature.

Optionally, the determining module is specifically configured to:

collect a waveform data signal of the selected pin in the OBD interface;

convert the waveform data signal into a corresponding digital signal; and obtain, after analyzing the digital signal, the first bus feature of the connection cable associated with the selected pin.

Optionally, the converting the waveform data signal into a corresponding digital signal includes:

sampling the waveform data signal to obtain a sampled signal, where the sampled signal is used to represent a plurality of voltage values; and converting the sampled signal into the corresponding digital signal, where the voltage values in the sampled signal correspond to a preset quantity of bits.

Optionally, the first bus feature includes any one or more of the following features:

a high level voltage value, a low level voltage value and a baud rate.

Optionally, the OBD interface bus feature library includes a physical layer feature of each bus and a bus type corresponding to the physical layer feature, including a high level voltage value, a low level voltage value and a baud rate.

According to a fourth aspect, an embodiment of the present invention provides an OBD interface bus type detection apparatus, including:

a receiving module, configured to receive a second bus feature of a connection cable associated with a selected pin in an on-board diagnostics OBD interface, where the second bus feature is obtained according to a bus type of the connection cable associated with the selected pin, the bus type being determined according to a first bus feature of the connection cable associated with the selected pin and an OBD interface bus feature library; and a judging module, configured to judge whether a bus feature that is set in a current on-vehicle communications protocol adopted for diagnostic scanning matches the second bus feature of the connection cable associated with the selected pin and reset an on-vehicle communications protocol if the bus feature that is set in the current on-vehicle communications protocol adopted for diagnostic scanning does not match the second bus feature of the connection cable associated with the selected pin.

Optionally, the judging module is further configured to: after the second bus feature of the connection cable associated with the selected pin in the on-board diagnostics OBD interface is received, judge that communication is performed with the selected pin in the OBD by adopting the current on-vehicle communications protocol if the bus feature that is set in the current on-vehicle communications protocol adopted for diagnostic scanning matches the second bus feature.

Optionally, the judging module is specifically configured to:

compare the bus feature that is set in the on-vehicle communications protocol adopted for diagnostic scanning with the second bus feature, to obtain M differences, where M is a quantity of features for comparison, M being a positive integer;

judge whether a difference greater than a preset limit value corresponding to the difference exists in the M differences; and determine that the bus feature that is set in the current on-vehicle communications protocol does not match the second bus feature if the difference greater than the preset limit value corresponding to the difference exists in the M differences.

According to a fifth aspect, an embodiment of the present invention provides an OBD interface bus type detection device, including:

a memory, configured to store a program; and a processor, configured to execute the program stored in the memory, where when the program is executed, the processor is configured to perform the method according to any of the first aspect and/or the method according to any of the second aspect.

According to a sixth aspect, the embodiment of the present invention provides a computer-readable storage medium, including: an instruction, where when run on a computer, the instruction causes the computer to perform the method according to any of the first aspect and/or perform the method according to any of the second aspect.

The present invention provides the method and OBD interface bus type detection apparatus. The first bus feature of the connection cable associated with the selected pin in the on-board diagnostics OBD interface is determined; the first bus feature is matched with the OBD interface bus library, the bus type of the connection cable associated with the selected pin being determined; the second bus feature of the connection cable associated with the selected pin is determined according to the bus type of the connection cable associated with the selected pin; and the second bus feature is sent to the vehicle diagnostic instrument, to enable the vehicle diagnostic instrument to perform communications protocol scanning on the selected pin in the OBD interface according to the second bus feature. In the present invention, the second bus feature of the connection cable associated with the selected pin in the OBD interface is first determined, so that the communications protocol meeting the second bus feature can be directly adopted by the vehicle diagnostic instrument to perform diagnostic scanning on the selected pin, thereby reducing scanning interference for different bus types.

BRIEF DESCRIPTION OF THE DRAWINGS

FIG. 1 is a schematic diagram of an application scenario 1 according to an embodiment of the present invention;

FIG. 2 is a flowchart of an OBD interface bus type detection method according to Embodiment 1 of the present invention;

FIG. 9 is a schematic diagram of dominant-bit level signals of different CAN buses.

DETAILED DESCRIPTION

Figure 3:
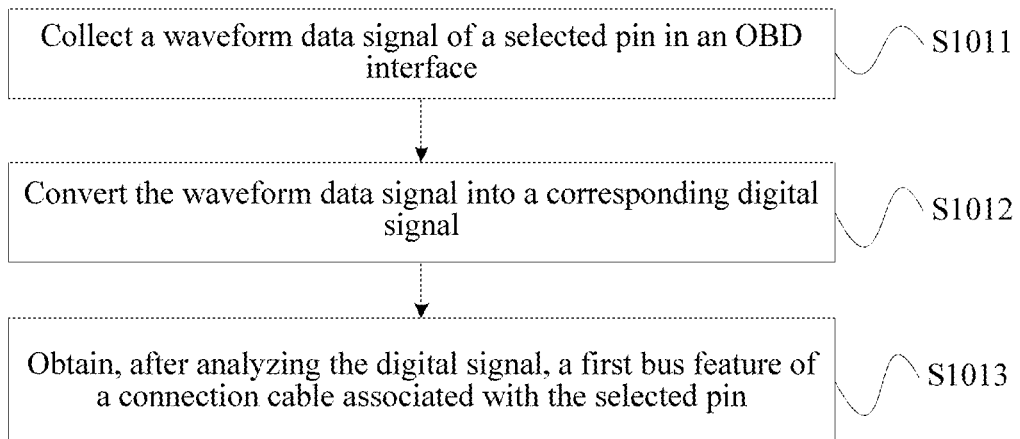
FIG. 3 is a flowchart of a method of step S101 in Embodiment 1 of the present invention.

The following describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way is interchangeable in proper circumstances so that the embodiments of the present invention described herein can, for example, be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not clearly listed or inherent to such a process, method, system, product, or device.

The technical solutions in the present invention are described below in detail by using specific embodiments. The following several specific embodiments may be combined with each other, and same or similar concepts or processes may not be repeatedly described in some embodiments.

In the following, some terms in this application are described, to help a person skilled in the art have a better understanding.

(1) An on-board diagnostics (OBD) is mainly configured to monitor, according to a running status of an engine and a working status of a tail gas after-treatment system, at any time whether vehicle exhaust emissions exceed the standards. Once the vehicle exhaust emissions exceed the standards, the OBD immediately issues a warning.

(2) On-board diagnostics II (OBD II): To standardize vehicle emission and driving-related fault diagnosis, since 1996, diagnostic instruments, fault codes and maintenance steps of all new cars sold in the United States must be similar, that is, meet procedure regulations of OBD II. As a degree of economic globalization and a degree of vehicle automobile internationalization increase, an OBD II system, as a basis of driving and emission diagnosis, is implemented and applied more widely.

(3) An electronic control unit (ECU) is configured to detect and analyze a function of an emission-related fault. The OBD monitors systems and components, such as an engine, a catalytic converter, a particulate trap, an oxygen sensor, an emission control system, a fuel system and an EGR, in real time, and then, sends component information related to emission to the ECU. When an emission fault occurs, the ECU records fault information and a related code and issues a warning by using a fault lamp, to inform a driver.

(4) A controller area network (CAN) is developed by BOSCH, a German company famous for researching, developing, and producing automotive electronic products, finally becomes an international standard, and is one of the most widely applied field buses in the world. In North America and Western Europe, a CAN-bus protocol has become a standard bus of an automotive computer control system and an embedded industrial control local area network, and has a J1939 protocol with the CAN as an underlying protocol designed for large trucks and heavy machinery vehicles.

(5) A first input first output (FIFO) memory is a first input first output dual-port buffer, that is, data that first enters the buffer is first removed. One port of the dual-port buffer is an input port of the memory. The other port is an output port of the memory.

(6) An analog-to-digital converter (ADC) is configured to convert an analog signal into a digital signal.

(7) A microcontroller unit (MCU), also referred to as a single chip microcomputer or a single chip computer, is to reduce a frequency and specifications of a central processing unit (CPU) properly and integrate peripheral interfaces, such as a memory, a counter (timer), a universal serial bus and an A/D converter, and even a drive circuit into a single chip to form a chip-level computer. Different combined control made for different application scenarios may be applied to control of a mobile phone, a peripheral of a personal computer (PC), a remote control, vehicle electronics, an industrial step motor, a robot arm and the like.

(8) A vehicle converter interface (VCI) is configured to connect an OBD interface and an external terminal. The terminal may include a computer. In the present invention, the OBD interface is electrically connected to a diagnostic PC through the VCI. Diagnostic software is run in the diagnostic PC. Analysis is performed through the microcontroller unit MCU on signals collected by different pins of the OBD interface.

An OBD interface bus type detection method provided in the present invention may be widely applied to vehicle fault diagnosis.

FIG. 1 is a schematic diagram of an application scenario 1 according to an embodiment of the present invention. FIG. 1 presents a system for monitoring vehicle emissions by applying an on-board diagnostics OBD. As shown in FIG. 1, the system includes an OBD loaded on a vehicle, a VCI connected to a vehicle OBD interface and a vehicle diagnostic instrument connected to the VCI. First, the OBD interface adopts a 16-pin OBD diagnostic interface meeting standards of the society of automotive engineers (SAE) of the United States, communicates with an electronic control unit (ECU) of a vehicle engine by using a protocol such as a K-line protocol or a CAN-bus protocol, and obtains and forwards a data instruction on a vehicle bus; and adopts an STM32 single chip computer to implement diagnostic data processing and analysis, implements remote data transmission by using a wireless communications module, and finally obtains diagnostic data of the vehicle. When the OBD is started, and the vehicle is diagnosed by using the external diagnostic device, a protocol type of a specific electronic control unit (ECU) usually needs to be determined in a manner of scanning on-vehicle communications protocols in sequence. However, different on-vehicle communications protocols are based on different physical layer protocols, and therefore, have greatly different levels and potentials output on a bus. Determining the protocol type of the specific ECU in the manner of scanning the on-vehicle communications protocols in sequence may seriously interfere with some bus communication data and affect diagnosis of the vehicle.

The OBD interface bus type detection method provided in this embodiment of the present invention aims at resolving the foregoing technical problems in the prior art.

The technical solutions in the present invention and how the technical solutions in the present application resolve the foregoing technical problems are described below in detail by using embodiments. The following several specific embodiments may be combined with each other, and same or similar concepts or processes may not be repeatedly described in some embodiments. The following describes the embodiments of the present invention with reference to the accompanying drawings.

Figure 8:
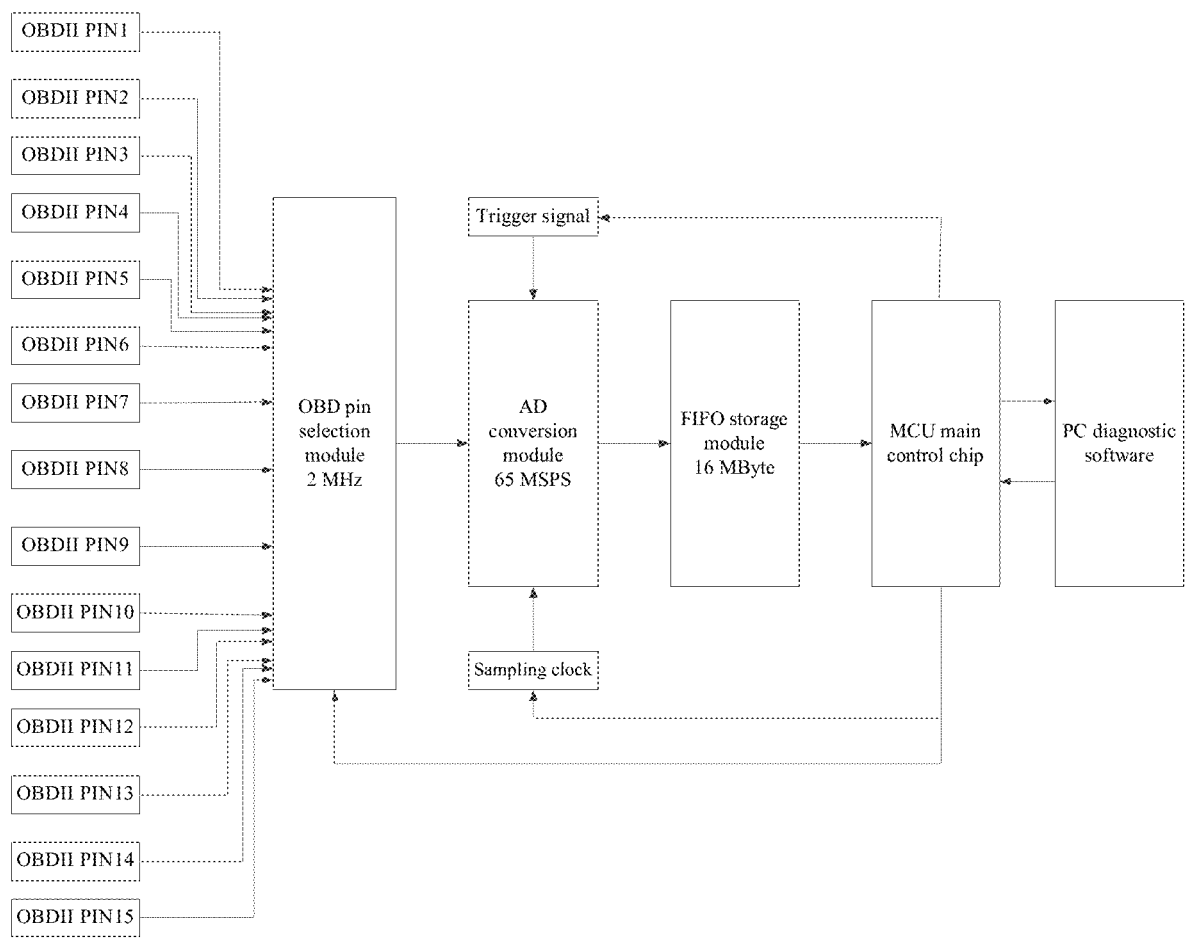
FIG. 8 is a schematic structural diagram of an OBD interface bus type detection device according to Embodiment 2 of the present invention.

FIG. 2 is a flowchart of an OBD interface bus type detection method according to Embodiment 1 of the present invention. FIG. 8 is a schematic structural diagram of an OBD interface bus type detection device according to Embodiment 2 of the present invention. FIG. 9 is a schematic diagram of dominant-bit level signals of different CAN buses. With reference to FIG. 2, FIG. 8 and FIG. 9, the method in this embodiment may be applied to a VCI, and the method may include the following steps.

S101. Determine a first bus feature of a connection cable associated with a selected pin in an on-board diagnostics OBD interface.

In this embodiment, the selected pin may be selected by a vehicle diagnostic instrument. For example, indication information is sent to instruct a VCI to select a pin, or any pin in the OBD interface is selected by using the VCI. As shown in FIG. 8, an OBD pin selection module may be controlled by an MCU main control chip to select any one or more pins of the OBD interface. After the pin is determined, a waveform data signal of the pin is collected. An OBD II interface in FIG. 8 is used as an example for description. However, an interface type of the OBD is not limited in this embodiment. It should be noted that there may be a plurality of ECUs in a vehicle. Communications protocols used by different ECUs may be same or different. OBD interface pins connected to specific ECUs in different vehicles may be different. Therefore, before performing diagnosis, an existing OBD needs to determine bus types connected to different pins in the OBD interface in a manner of scanning on-vehicle communications protocols in sequence, to implement communication between the ECUs connected to the pins. A scanning process of the existing OBD includes: sending a sounding signal adopting a current on-vehicle communications protocol to a pin of the OBD interface, and when a corresponding feedback signal is received from one or more pins, determining a bus type of the pin and a communications protocol type used by the ECU connected to the pin. In addition, it should be clarified that the OBD interface bus type detection method in this embodiment is not based on the existing OBD loaded on a vehicle, but is implemented by using an independent VCI device connected to the OBD interface.

S102. Match the first bus feature with an OBD interface bus feature library and determine a bus type of the connection cable associated with the selected pin.

In this embodiment, the first bus feature obtained through analysis in step S101 is matched with the OBD interface bus feature library, where the OBD interface bus feature library includes a physical layer feature of each bus and a bus type corresponding to the physical layer feature, including a high level voltage value, a low level voltage value and a baud rate. Specifically, as shown in FIG. 9, using different types of CAN buses in FIG. 9 as an example, high level voltage values and low level voltage values of the different types of CAN buses are presented.

Optionally, the bus type is approximately determined according to a baud rate value, for example, when the baud rate value meets a typical baud rate value such as 125 kHZ, 250 kHZ, 500 kHZ or 3333 HZ, a connection cable corresponding to a pin may be determined as a CAN-bus protocol. Further, a specific bus type of the connection cable corresponding to the pin is analyzed according to the high level voltage value and the low level voltage value. For example, when a level of a dominant bit is 4 V, the bus type of the connection cable corresponding to the pin may be determined as a single bus CAN. When a high level of a dominant bit CANH is 4 V, a low level of a dominant bit CANL being approximately 1 V, the bus type of the connection cable corresponding to the pin may be determined as a low-speed error tolerant CAN. When the high level of the dominant bit CANH is approximately 3.6 V, the low level of the dominant bit CANL being approximately 1.4 V, the bus type of the connection cable corresponding to the pin may be determined as a high-speed CAN.

S103. Determine, according to the bus type of the connection cable associated with the selected pin, a second bus feature of the connection cable associated with the selected pin.

In this embodiment, when a bus feature corresponding to the first bus feature meets a bus feature corresponding to the OBD interface bus feature library, a bus type corresponding to the bus feature in the OBD interface bus feature library is obtained, all bus features corresponding to the bus type being obtained by using the bus type, all the bus features being used as information in the second bus feature of the connection cable corresponding to the pin. The second bus feature includes pin information, a baud rate, a physical protocol type to which the second bus feature belongs and the like.

S104. Send the second bus feature to a vehicle diagnostic instrument, to enable the vehicle diagnostic instrument to perform communications protocol scanning on the selected pin in the OBD interface according to the second bus feature.

In this embodiment, the VCI may send the obtained second bus feature of the connection cable associated with the selected pin to the vehicle diagnostic instrument, so that when setting a communications protocol, the vehicle diagnostic instrument selects a communications protocol meeting the second bus feature to perform communications protocol scanning on the connection cable associated with the selected pin.

In this embodiment, the first bus feature of the connection cable associated with the selected pin in the on-board diagnostics OBD interface is determined; the first bus feature is matched with the OBD interface bus library, the bus type of the connection cable associated with the selected pin being determined; the second bus feature of the connection cable associated with the selected pin is determined according to the bus type of the connection cable associated with the selected pin; and the second bus feature is sent to the vehicle diagnostic instrument, to enable the vehicle diagnostic instrument to perform communications protocol scanning on the selected pin in the OBD interface according to the second bus feature. The present invention first determines the second bus feature of the connection cable associated with the selected pin in the OBD interface, so that the vehicle diagnostic instrument may directly adopt the communications protocol meeting the second bus feature to perform diagnostic scanning on the selected pin, thereby reducing scanning interference for different bus types.

FIG. 3 is a flowchart of a method of an implementation of step S101 in Embodiment 1 of the present invention. As shown in FIG. 3, the method in step S101 may include the following steps.

S1011. Collect a waveform data signal of a selected pin in an OBD interface.

In this embodiment, the OBD interface on a vehicle is connected to a diagnostic PC (a vehicle diagnostic instrument) by using a vehicle converter interface VCI. The VCI herein functions as a data receiving converter. When the VCI is connected to the OBD interface, the waveform data signal on an OBD pin is received by the VCI. The waveform data signal on the OBD pin is a signal formed by the OBD interface when the OBD interface is connected and powered on. When the OBD interface pin that the vehicle may use is learned in advance, the waveform data signal of one or more corresponding pins in the OBD interface is selected according to a known situation.

S1012. Convert the waveform data signal into a corresponding digital signal.

In this embodiment, the waveform data signal corresponding to the selected pin is converted into the corresponding digital signal. For example, an analog voltage signal is sampled to obtain a discrete voltage value, and a binary numeral may be used to represent each discrete voltage value. Optionally, the waveform data signal may be converted into a voltage value of a preset bit at a preset sampling rate. As shown in FIG. 8, an AD conversion module is controlled by using a trigger signal and a sampling clock signal sent by an MCU main control chip to convert the waveform data signal corresponding to the selected pin into a sampled signal at the preset sampling rate, the sampled signal including at least one voltage value. Further, the sampled signal may be converted into the corresponding digital signal according to a correspondence between the voltage value and a bit. The voltage value may correspond to different quantities of bits. For example, the voltage value may correspond to 4 bits or 8 bits. Different bit values correspond to different voltage values. For example, a four-bit binary numeral 0010 may represent that the voltage value is 2 V, or a four-bit binary numeral 0001 may represent that the voltage value is 1 V, which is not limited herein.

S1013. Obtain, after analyzing the digital signal, a first bus feature of a connection cable associated with the selected pin.

In this embodiment, all voltage values collected within a certain period may be obtained. A rule that the voltage values change with time is analyzed, to obtain a high level voltage value and a low level voltage value in a period. Alternatively, a baud rate of the waveform data signal corresponding to the digital signal is obtained according to the rule that the voltage values change with time. The first bus feature of the connection cable associated with the selected pin may be obtained according to an analysis structure of the digital signal, the first bus feature including any one or more features of a high level voltage value, a low level voltage value and a baud rate.

In this embodiment, the waveform data signal of the selected pin in the on-board diagnostics OBD interface is collected. The waveform data signal is converted into the corresponding digital signal. The first bus feature of the connection cable corresponding to the pin is obtained after the digital signal is analyzed. The first bus feature is matched with an OBD interface bus feature library, a bus type of the connection cable corresponding to the pin being determined. Therefore, when the on-board diagnostics performs scanning automatically, reference is provided for a bus feature that is set in the on-vehicle communications protocol. In a diagnostic scanning process, some bus communication data is prevented from being seriously interfered with, and diagnosis of the vehicle is prevented from being affected.

Figure 4:
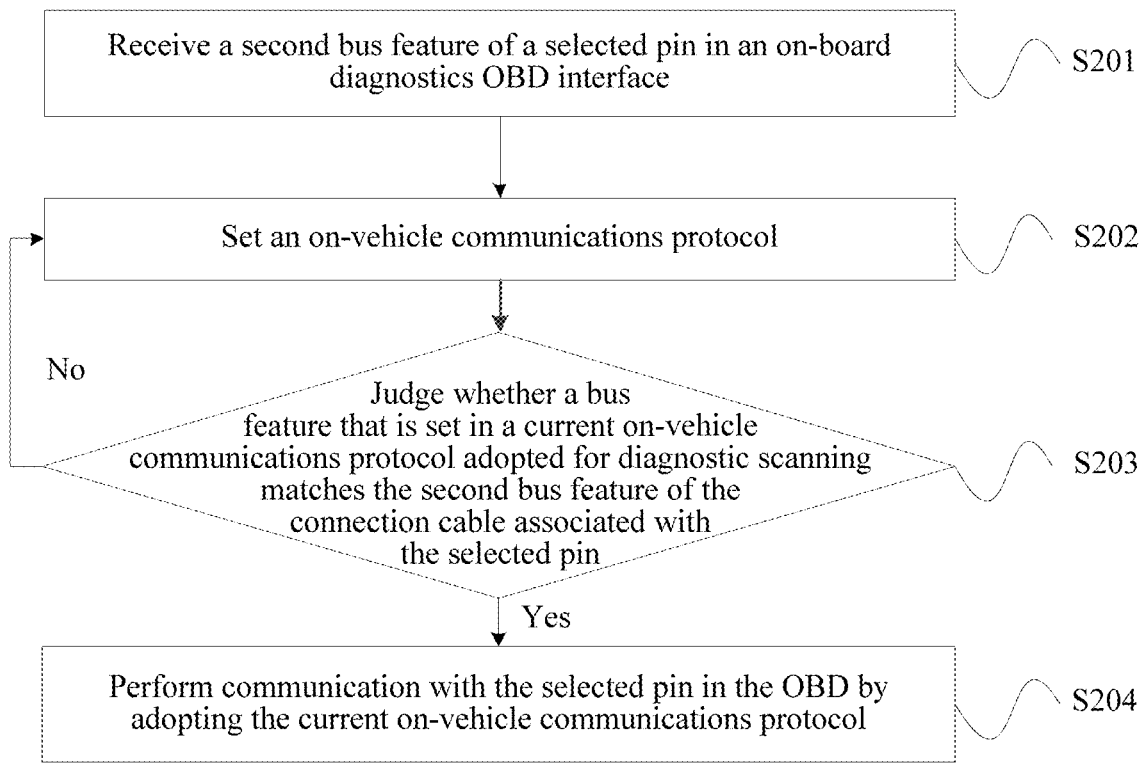
FIG. 4 is a flowchart of an OBD interface bus type detection method according to Embodiment 2 of the present invention.

FIG. 4 is a flowchart of an OBD interface bus type detection method according to Embodiment 2 of the present invention. As shown in FIG. 4, the method in this embodiment may include the following steps.

S201. Receive a second bus feature of a connection cable associated with a selected pin in an on-board diagnostics OBD interface.

In this embodiment, the second bus feature of the connection cable associated with the selected pin in the on-board diagnostics OBD interface is first received. Alternatively, an indication message is sent to a VCI by a vehicle diagnostic instrument. A pin number that needs to be scanned and that is in the OBD interface is determined by using the indication message.

S202. Set an on-vehicle communications protocol.

In this embodiment, an on-vehicle communications protocol is set first, the on-vehicle communications protocol being matched with the second bus feature of the selected pin through step S203. When a currently used on-vehicle communications protocol does not match the second bus feature, the current on-vehicle communications protocol is skipped. In addition, whether scanning is finished is judged. If the scanning is finished, diagnostic scanning is ended. If the scanning is not finished, the on-vehicle communications protocol is reset.

S203. Judge whether a bus feature that is set in a current on-vehicle communications protocol adopted for diagnostic scanning matches the second bus feature of the connection cable associated with the selected pin, if the bus feature that is set in the current on-vehicle communications protocol adopted for diagnostic scanning does not match the second bus feature of the connection cable associated with the selected pin, perform step S202 again, and if the bus feature that is set in the current on-vehicle communications protocol adopted for diagnostic scanning matches the second bus feature of the connection cable associated with the selected pin, perform step S204.

In this embodiment, the bus feature that is set in the on-vehicle communications protocol adopted for diagnostic scanning is compared with the second bus feature, to obtain M differences, where M is a quantity of features for comparison, M being a positive integer; whether a difference greater than a preset limit value corresponding to the difference exists in the M differences is judged, and if the difference greater than the preset limit value corresponding to the difference exists in the M differences, it is determined that the bus feature that is set in the current on-vehicle communications protocol does not match the second bus feature. Specifically, using a high level voltage value as an example, a high level voltage of the second bus feature is subtracted from a high level voltage value of the bus feature that is set in the on-vehicle communications protocol, to obtain a difference between the high level voltage values. If the difference is greater than a preset limit value, it is determined that the currently used on-vehicle communications protocol does not match the second bus feature. If the on-vehicle communications protocol is adopted, a bus control device is affected, and normal communication of the bus is interfered with.

S204. Perform communication with the selected pin in the OBD by adopting the current on-vehicle communications protocol.

In this embodiment, the current on-vehicle communications protocol is directly used for performing communication with the selected pin in the OBD. Scanning other on-vehicle communications protocols is skipped. Scanning efficiency is improved to some extent. Time for establishing communication between the vehicle diagnostic instrument and an ECU is shortened.

In this embodiment, the second bus feature of the connection cable associated with the selected pin in the on-board diagnostics OBD interface is first received. The bus feature that is set in the on-vehicle communications protocol is compared with the second bus feature. An on-vehicle communications protocol matching the second bus feature is obtained. When automatically performing scanning, the on-board diagnostics actively skips, according to the bus type of the connection cable corresponding to the pin, scanning of the on-vehicle communications protocol that may interfere with the bus. While the bus is protected, efficiency of whole vehicle scanning is effectively improved.

Figure 5:
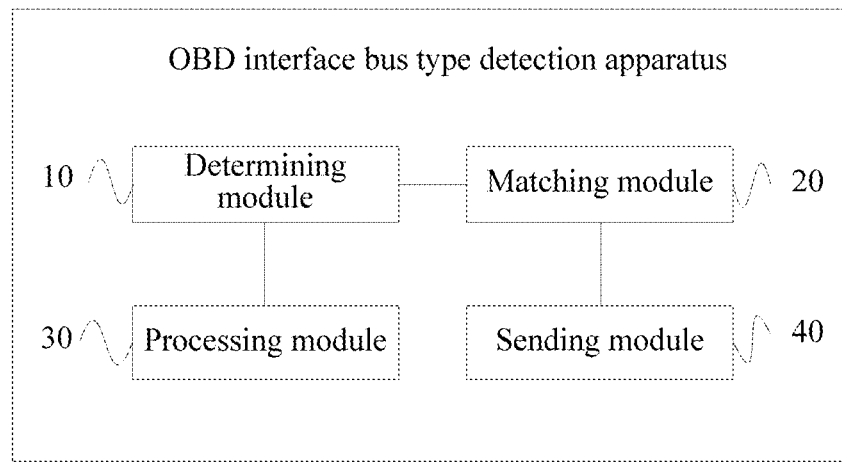
FIG. 5 is a schematic structural diagram of an OBD interface bus type detection apparatus according to Embodiment 1 of the present invention.

FIG. 5 is a schematic structural diagram of an OBD interface bus type detection apparatus according to Embodiment 1 of the present invention. As shown in FIG. 5, the apparatus in this embodiment may include:

a determining module 10, configured to determine a first bus feature of a connection cable associated with a selected pin in on-board diagnostics OBD interface;

a matching module 20, configured to match the first bus feature with an OBD interface bus feature, and determine a bus type of the connection cable associated with the selected pin;

a processing module 30, configured to determine, according to the bus type of the connection cable associated with the selected pin, a second bus feature of the connection cable associated with the selected pin; and a sending module 40, configured to send the second bus feature to a vehicle diagnostic instrument, to enable the vehicle diagnostic instrument to perform communications protocol scanning on the selected pin in the OBD interface according to the second bus feature.

Optionally, the determining module 10 is specifically configured to:

collect a waveform data signal of the selected pin in the OBD interface;

convert the waveform data signal into a corresponding digital signal; and obtain, after analyzing the digital signal, the first bus feature of the connection cable associated with the selected pin.

Optionally, the converting the waveform data signal into a corresponding digital signal includes:

sampling the waveform data signal to obtain a sampled signal, where the sampled signal is used to represent a plurality of voltage values; and converting the sampled signal into the corresponding digital signal, where the voltage values in the sampled signal correspond to a preset quantity of bits.

Optionally, the first bus feature includes any one or more of the following features:

a high level voltage value, a low level voltage value and a baud rate.

Optionally, the OBD interface bus feature library includes a physical layer feature of each bus and a bus type corresponding to the physical layer feature, including a high level voltage value, a low level voltage value and a baud rate.

This embodiment may implement the technical solutions in the foregoing method shown in FIG. 2 and FIG. 3. An implementation process and a technical effect of this embodiment are similar to those of the foregoing method. Details are not described herein again.

The functions of the foregoing apparatus may be implemented by the VCI.

Figure 6:
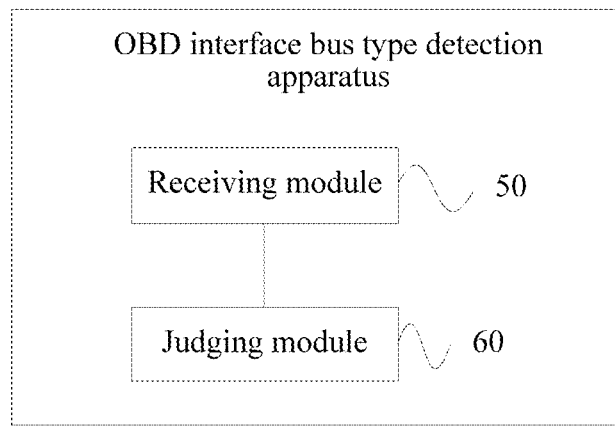
FIG. 6 is a schematic structural diagram of an OBD interface bus type detection apparatus according to Embodiment 2 of the present invention.

FIG. 6 is a schematic structural diagram of an OBD interface bus type detection apparatus according to Embodiment 2 of the present invention. As shown in FIG. 6, the apparatus in this embodiment may include:

a receiving module 50, configured to receive a second bus feature of a connection cable associated with a selected pin in an on-board diagnostics OBD interface, where the second bus feature is obtained according to a bus type of the connection cable associated with the selected pin, the bus type being determined according to a first bus feature of the connection cable associated with the selected pin and an OBD interface bus feature library; and a judging module 60, configured to judge whether a bus feature that is set in a current on-vehicle communications protocol adopted for diagnostic scanning matches the second bus feature of the connection cable associated with the selected pin and reset an on-vehicle communications protocol if the bus feature that is set in the current on-vehicle communications protocol adopted for diagnostic scanning does not match the second bus feature of the connection cable associated with the selected pin.

Optionally, the judging module 60 is further configured to: after the second bus feature of the connection cable associated with the selected pin in the on-board diagnostics OBD interface is received, judge that communication is performed with the selected pin in the OBD by adopting the current on-vehicle communications protocol if the bus feature that is set in the current on-vehicle communications protocol adopted for diagnostic scanning matches the second bus feature.

Optionally, the judging module 60 is specifically configured to:

compare the bus feature that is set in the on-vehicle communications protocol adopted for diagnostic scanning with the second bus feature, to obtain M differences, where M is a quantity of features for comparison, M being a positive integer;

judge whether a difference greater than a preset limit value corresponding to the difference exists in the M differences; and determine that the bus feature that is set in the current on-vehicle communications protocol does not match the second bus feature if the difference greater than the preset limit value corresponding to the difference exists in the M differences.

This embodiment may implement the technical solution in the foregoing method shown in FIG. 4. An implementation process and a technical effect of this embodiment are similar to those of the foregoing method. Details are not described herein.

The functions of the foregoing apparatus may be implemented by the vehicle diagnostic instrument.

Figure 7:
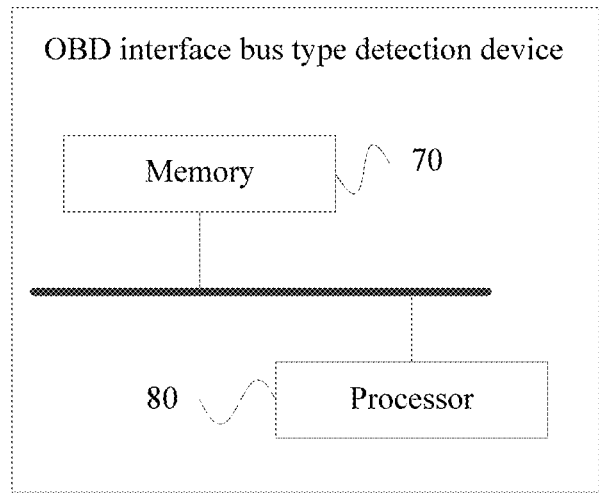
FIG. 7 is a schematic structural diagram of an OBD interface bus type detection device according to Embodiment 1 of the present invention.

FIG. 7 is a schematic structural diagram of an OBD interface bus type detection device according to Embodiment 1 of the present invention. As shown in FIG. 7, the device in this embodiment may include:

a memory 70, configured to store a program; and a processor 80, configured to execute the program stored in the memory, where when the program is executed, the processor 80 is configured to perform the technical solutions in the foregoing method shown in FIG. 2 to FIG. 4.

The detection device shown in FIG. 7 may be a VCI. In this case, the processor 80 is configured to perform the technical solutions in the foregoing method shown in FIG. 2 and FIG. 3.

The detection device shown in FIG. 7 may be the vehicle diagnostic instrument. In this case, the processor 80 is configured to perform the technical solution in the foregoing method shown in FIG. 4.

Certainly, the foregoing device may further include a communication interface and the like, configured to communicate with other devices.

FIG. 8 is a schematic structural diagram of an OBD interface bus type detection apparatus according to Embodiment 2 of the present invention. As shown in FIG. 8, by using an OBD II interface of an on-board diagnostics II (OBD II) as an example, the device in this embodiment may include: an OBD pin selection module (a channel selector), an AD conversion module (an AD converter), a FIFO storage module (a FIFO memory), an MCU main control chip, and PC diagnostic software (a computer program). The OBD pin selection module is electrically connected to a communication line of the OBD II interface, is configured to collect, according to a trigger signal sent by the MCU main control chip, a waveform data signal of a connection cable of any pin of the OBD II interface at a frequency of a sampling clock, and transmit the waveform data signal to the AD conversion module. Therefore, a function of selecting one from a plurality of data channels is implemented. In a specific implementation, the baud rate that the waveform data signal may pass is not lower than 2 MHZ, and an input voltage value is not lower than 30 V. The AD conversion module converts the received waveform data signal into a 14-bit voltage value at a specified sampling rate, and transmits the voltage value to the FIFO storage module. The FIFO storage module stores the voltage value sent by the AD conversion module, and sends the voltage value to the MCU main control chip according to a first input first output rule. The MCU main control chip is configured to run a VCI control program to complete analysis of the bus types of all pins in the OBD II interface. It should be noted that this embodiment describes by using the OBD II interface as an example. However, a specific type of the OBD interface is not limited.

Optionally, a waveform feature detector of an analog-to-digital converter ADC is adopted to directly detect the waveform data signal of the OBD interface, and output a digital signal including information such as a physical level feature and a speed feature. The bus feature of the connection cable corresponding to the OBD interface is obtained by analyzing the digital signal. The bus feature is compared with a feature of a bus of a known type. If an error falls within an allowable error range, the bus type of the connection cable corresponding to the OBD interface is determined.

It should be noted that the apparatus in this embodiment may be implemented by an existing VCI added with an AD conversion module and a FIFO buffer module. When the VCI including the AD conversion module and the FIFO buffer module is connected to a PC loaded with a detection program, the technical solutions in the foregoing method shown in FIG. 2 and FIG. 3 may be performed.

This embodiment may implement the technical solutions in the foregoing method shown in FIG. 2 and FIG. 3. An implementation process and a technical effect of this embodiment are similar to those of the foregoing method. Details are not described herein again.

In addition, the embodiment of the present application further provides a computer-readable storage media. The computer-readable storage medium stores a computer-executable instruction. When at least one processor of user equipment executes the computer-executable instruction, the user equipment performs the foregoing various possible methods.

The computer-readable media includes a computer storage medium and a communications medium, the communications medium including any medium that facilitates transferring the computer program from one place to another place. The storage medium may be any available medium that may be accessed by a general-purpose or special-purpose computer. An exemplary storage media is coupled to the processor, so that the processor may read information from the storage medium, and write information to the storage medium. Certainly, the storage medium may alternatively be a part of the processor. The processor and the storage medium may be located in an ASIC. In addition, the ASIC may be located in user equipment. Certainly, the processor and the storage medium may alternatively exist in a communications device as discrete components.

A person of ordinary skill in the art may understand that: all or some steps of the foregoing method embodiments may be performed through hardware related to a program instruction. The foregoing program may be stored in the computer-readable storage medium. When the program is executed, the steps including the foregoing method embodiments are executed. The foregoing storage medium includes: various mediums, such as a ROM, a RAM, a magnetic disk, or an optical disc, that can store program code.

Finally, it should be noted that the foregoing embodiments are merely intended to describe the technical solution of the present invention, and are not intended to limit the present invention. Although the present invention is described in detail with reference to the foregoing embodiments, a person of ordinary skill in the art should understand that modifications may still be made to the technical solutions described in the foregoing embodiments or equivalent replacements may be made to some or all technical features in the foregoing embodiments. The modifications or replacements do not make the technical solutions essentially depart from the scope of the technical solutions of the embodiments of the present invention.

What is claimed is:

1. An on-board diagnostics (OBD) interface bus type detection method, comprising steps of:
   determining a first bus feature of a connection cable associated with a selected pin in the on-board diagnostics OBD interface, wherein the OBD interface is independently arranged and connected with the vehicle-mounted diagnosis system;
   matching the first bus feature with an OBD interface bus feature library and determining a bus type of the connection cable associated with the selected pin;
   determining, according to the bus type of the connection cable associated with the selected pin, a second bus feature of the connection cable associated with the selected pin; and
   sending the second bus feature to a vehicle diagnostic instrument, to enable the vehicle diagnostic instrument to perform communications protocol scanning on the selected pin in the OBD interface according to the second bus feature;
   wherein the step of determining a first bus feature of a connection cable associated with a selected pin in the OBD interface comprises:
   collecting a waveform data signal of the selected pin in the OBD interface;
   converting the waveform data signal into a corresponding digital signal; and
   obtaining the first bus feature of the connection cable associated with the selected pin after analyzing the digital signal.

2. The method according to claim 1, wherein the converting the waveform data signal into a corresponding digital signal comprises:
   sampling the waveform data signal to obtain a sampled signal, wherein the sampled signal is used to represent a plurality of voltage values; and
   converting the sampled signal into the corresponding digital signal, where the voltage values in the sampled signal correspond to a preset quantity of bits.

3. The method according to claim 1, wherein the first bus feature comprises any one or more of the following features:
   a high level voltage value, a low level voltage value and a baud rate.

4. The method according to claim 1, wherein the OBD interface bus feature library comprises a physical layer feature of each bus and a bus type corresponding to the physical layer feature, comprising a high level voltage value, a low level voltage value and a baud rate.

5. An on-board diagnostics (OBD) interface bus type detection method, comprising steps of:
   receiving a second bus feature of a connection cable associated with a selected pin in an on-board diagnostics OBD interface, wherein
   the second bus feature is obtained according to a bus type of the connection cable associated with the selected pin, the bus type being determined according to a first bus feature of the connection cable associated with the selected pin and an OBD interface bus feature library; and
   judging whether a bus feature that is set in a current on-vehicle communications protocol adopted for diagnostic scanning matches the second bus feature of the connection cable associated with the selected pin and resetting an on-vehicle communications protocol if the bus feature that is set in the current on-vehicle communications protocol adopted for diagnostic scanning does not match the second bus feature of the connection cable associated with the selected pin;
   wherein the judging step comprises: comparing the bus feature that is set in the on-vehicle communications protocol adopted for diagnostic scanning with the second bus feature, to obtain M differences, wherein M is a quantity of features for comparison, M being a positive integer; judging whether a difference greater than a preset limit value corresponding to the difference exists in the M differences; and determining that the bus feature that is set in the current on-vehicle communications protocol does not match the second bus feature if the difference greater than the preset limit value corresponding to the difference exists in the M differences.

6. The method according to claim 5, wherein after the receiving a second bus feature of a connection cable associated with a selected pin in an on-board diagnostics OBD interface, the method further comprises:
   performing communication with the selected pin in the OBD by adopting the current on-vehicle communications protocol if the bus feature that is set in the current on-vehicle communications protocol adopted for diagnostic scanning matches the second bus feature.

7. An on-board diagnostics (OBD) interface bus type detection apparatus, comprising:
   a determining module, configured to determine a first bus feature of a connection cable associated with a selected pin in an on-board diagnostics OBD interface, wherein the OBD interface is independently arranged and connected with the vehicle-mounted diagnosis system;
   a matching module, configured to match the first bus feature with an OBD interface bus feature library and determine a bus type of the connection cable associated with the selected pin;
   a processing module, configured to determine, according to the bus type of the connection cable associated with the selected pin, a second bus feature of the connection cable associated with the selected pin; and
   a sending module, configured to send the second bus feature to a vehicle diagnostic instrument, to enable the vehicle diagnostic instrument to perform communications protocol scanning on the selected pin in the OBD interface according to the second bus feature;
   wherein the determining module is further configured to collect a waveform data signal of the selected pin in the OBD interface convert the waveform data signal into a corresponding digital signal, and obtain the first bus feature of the connection cable associated with the selected pin after analyzing the digital signal.

8. An on-board diagnostics (OBD) interface bus type detection apparatus, comprising:
   a receiving module, configured to receive a second bus feature of a connection cable associated with a selected pin in an on-board diagnostics OBD interface, wherein
   the second bus feature is obtained according to a bus type of the connection cable associated with the selected pin, the bus type being determined according to a first bus feature of the connection cable associated with the selected pin and an OBD interface bus feature library; and a judging module, configured to judge whether a bus feature that is set in a current on-vehicle communications protocol adopted for diagnostic scanning matches the second bus feature of the connection cable associated with the selected pin and reset an on-vehicle communications protocol if the bus feature that is set in the current on-vehicle communications protocol adopted for diagnostic scanning does not match the second bus feature of the connection cable associated with the selected pin;

wherein the judging module is further configured to compare the bus feature that is set in the on-vehicle communications protocol adopted for diagnostic scanning witth, the second bus feature, to obtain M differences, wherein M is a quantity of features for comparison, M being a positve integer; judge whether a difference greater than a preset limit value corresponding to the difference exists in the M differences; and determine that the bus feature that is set in the current on-vehicle communications protocol does not match the second bus feature if the difference greater than the preset limit value corresponding to the difference exists in the M differences.

* * * * *